Dec. 17, 1968  D. R. HAMERLA  3,416,451
BATTERY ACTIVATOR SYSTEM
Filed Sept. 11, 1967  5 Sheets-Sheet 1

INVENTOR.
DONALD R. HAMERLA
BY Harry A. Herbert Jr.
Robert Kern Duncan and
ATTORNEYS

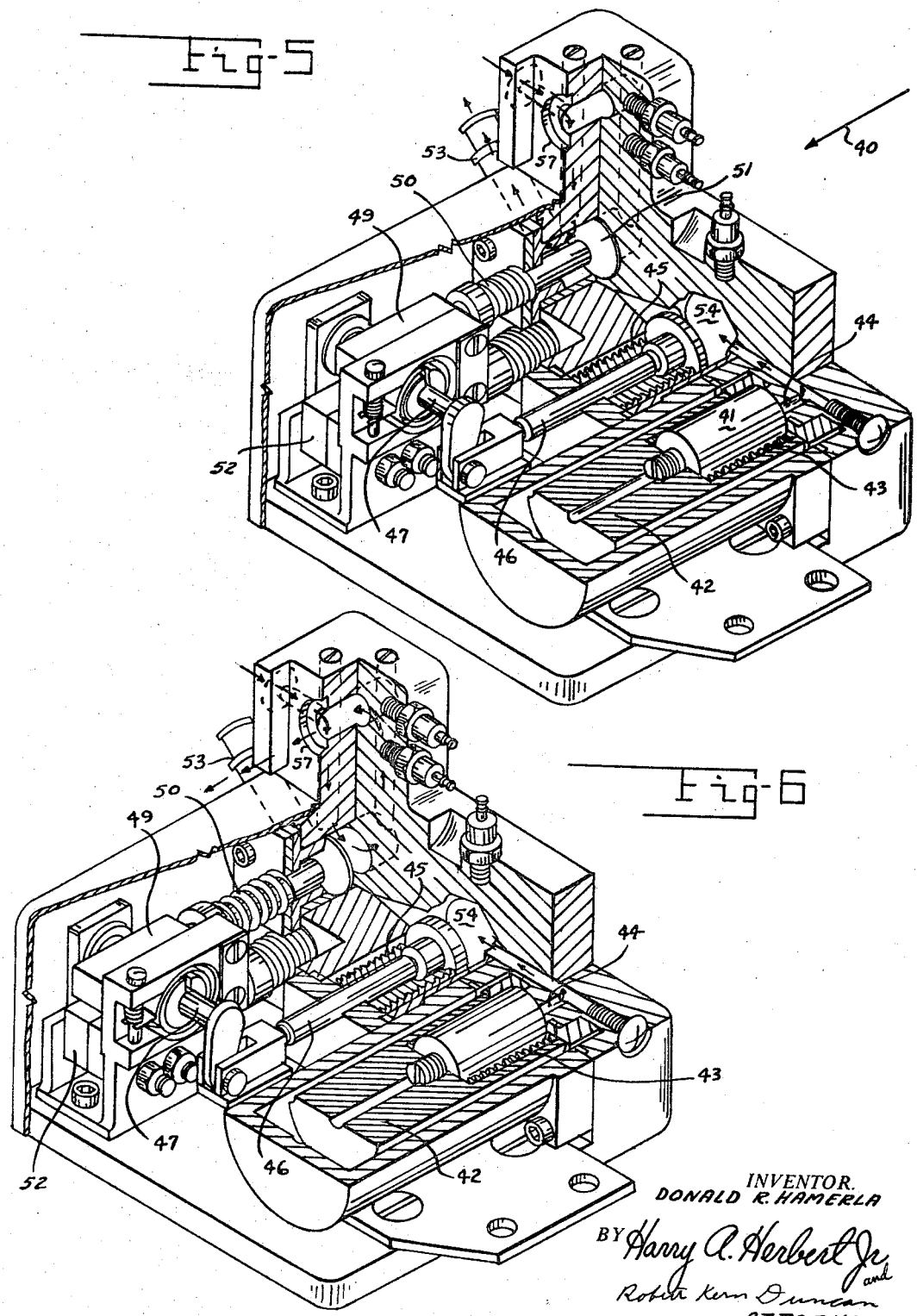

United States Patent Office 3,416,451
Patented Dec. 17, 1968

3,416,451
BATTERY ACTIVATOR SYSTEM
Donald R. Hamerla, King of Prussia, Pa., assignor to the United States of America as represented by the Secretary of the Air Force
Filed Sept. 11, 1967, Ser. No. 667,339
4 Claims. (Cl. 102—70.2)

ABSTRACT OF THE DISCLOSURE

An invironmental pressure activated two-way valve and an acceleration activated two-way valve, both with venting ports, are series connected in the fluid flow line between a squib pressurized electrolyte reservoir and a dry charged battery, for enabling the activation of the battery with electrolyte by the firing of the squib to occur only when the proper environmental conditions are present.

Background of the invention

The field of the invention is in the art of fluid armed battery activator systems for missiles. This invention provides a small, extremely fire and countermeasure resistant, safing and arming system for control of nuclear or conventional war heads.

In prior art systems, safety to preclude erroneous arming of the missile was generally achieved by using environmentally operated electrical switches in series between the battery and the war head. The electrical power required by the war head to produce a detonation is thereby inhibited until the system experiences certain unique environments peculiar to the launch-to-target trajectory. This system does not possess the degree of safety desired in consideration of the catastrophic results of an inadvertent detonation. A grave danger exists that under the unusually extreme environments that can occur as a result of an accident; (e.g., fire, crash, drop) the vehicle may be deformed such that short circuits may develop which could bypass the safety elements in the circuit. In the conventional fluid arming battery activator system, dry charged batteries are remotely activated by a radio signal (commonly called a Good Guidance Signal) causing the firing of a squib that forces, by gas pressure, electrolyte from a reservoir into the dry charged battery. This system is very prone to being prematurely activated in a fire or by other squib hazards such as electromagnetic radiation, shock, and lightning.

Summary of the invention

This invention discloses the apparatus and system for improving the safety and reliability of remotely activated, fluid electrically armed war heads, for use in missiles and similar vehicles. The improvement comprises acceleration and pressure sensors actuating two-way valves that are located in the fluid flow line of the electrolyte from the fluid reservoir to the dry charged battery. The same sensors may simultaneously operate to close electrical disconnect switches in the firing circuit of the squib. Rupturable diaphragms to provide better sealing and to extend shelf life are inserted in the fluid flow line. Fusible tubing for communicating the fluid, and a eutectic plug in the acceleration actuated sensor are used that melt below the thermal ignition temperature of the squib to provide additional safety and reliability. Thus, by making a link in the arming sequence a signal transmission in a fluid medium, this invention removes the probability of "short circuits" around electrical safety devices arming the missile.

Brief description of the drawing

FIG. 5 is a view of the acceleration responsive valve of FIG. 4 at the instant of change of direction of acceleration.

FIG. 6 is a view of the same device shown in FIGS. 4 and 5 showing the operation of mechanism immediately following in time that shown in FIG. 5; the fluid valve is in the open position and the electrical contacts are closed.

Referring to FIG. 1, a block diagram of a conventional fluid arming system for a war head carrying missile; an electrical initiation signal 1 termed a Good Guidance Signal (GGS) is generated on board the missile, usually by remote control means, shortly after burn-out when it has been determined that the missile is on a proper course and at a proper position. This signal ignites the squib gas generator 2 which forces the electrolyte out of the fluid flow outlet of the reservoir 3 and into the fluid flow inlet of the dry charged battery 4. The battery 4 then develops a potential and supplies electrical energy to activate, arm, and detonate the war head. As previously stated this system does not possess the safety desired.

FIG. 2 shows a block diagram of an embodiment of the improved system disclosed herein.

Figure 1:
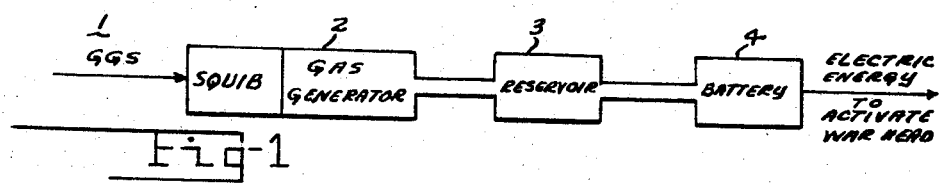
FIG. 1 is a block diagram of a conventional, state of the art, remote controlled, fluid armed, electrically activated war head system.
Figure 2:
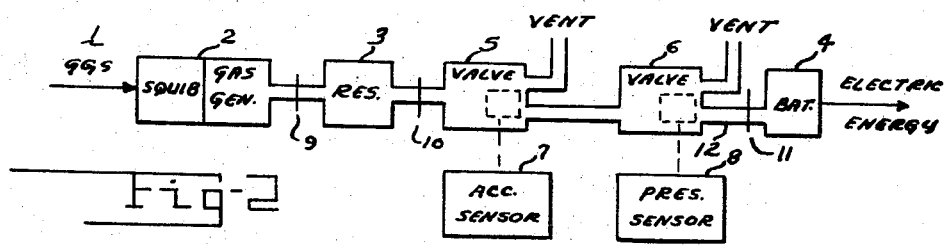
FIG. 2 is a block diagram of an embodiment of a fluid armed system of this invention having acceleration and pressure sensors controlling the fluid arming.
Figure 3:
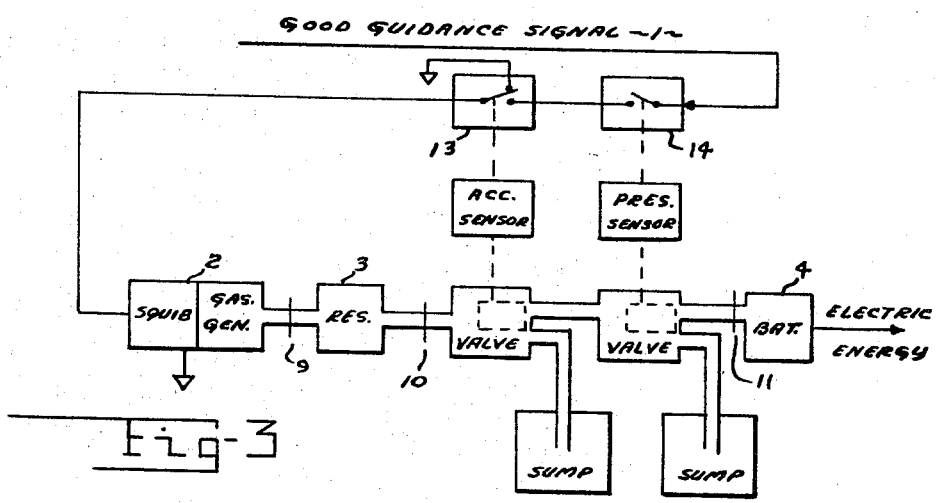
FIG. 3 is a block diagram of an embodiment of this invention having acceleration and pressure sensors controlling the fluid arming and the electrical firing circuit of the squib.

The electrical initiation signal, GGS (Good Guidance Signal) 1, the squib and gas generator 2, the reservoir 3, and the dry-charged battery 4 are the same as used in the conventional system of FIG. 1. In this embodiment of FIG. 2 two-way valves 5 and 6 having a through passage condition and a discharge passage condition are inserted in the fluid flow line between the reservoir 3 and the dry charged battery 4. The first valve 5 is actuated by the acceleration sensor 7, and the second valve 6 is actuated by the pressure sensor 8. The two-way valves 5 and 6 are maintained in the discharge condition, as shown, until the predetermined conditions of acceleration and pressure have been obtained. In the discharge condition electrolyte fluid is discharged by venting the fluid overboard as shown in FIG. 2 or discharged to a sump for containing the fluid as shown in FIG. 3. Thus should the squib erroneously fire when either of the predetermined conditions of acceleration and pressure do not exist the electrolyte is discharged and prohibited from flowing to the battery which would energize the war head. The valves 5 and 6 are shown, symbolically, in the discharge passage condition. Symbolically for the through passage condition the sensors would move the representative mechanism up to close the discharge port and open the through passage port. Lines 9, 10, and 11 represent rupturable metallic diaphragm seals. They are ruptured by the gas pressure that forces the electrolyte through the system. Their use has been found desirable to maintain the required sealing needed if extended shelf life (storage) of the system is demanded. It is also desirable in the interest of safety to have the interconnecting tubing, particularly the fluid connection 12 to the battery, fabricated of material of low melting point or fusible alloys or plastics that will melt below the thermal ignition temperature of the squib. Such materials are well known, examples being polystyrene, plexiglass, polyethylene, Wood's metal and many others.

An embodiment of this invention is shown in FIG. 3 wherein the acceleration and pressure sensors in the actuation of the two-way valves also actuate electrical switches in the squib electrical ignition circuit. Thus, switches 13 and 14 remain open until the predetermined conditions of acceleration and pressure have been achieved. This further precludes the accidental firing of the squib until the proper environment of launch-to-target trajectory is obtained. It has been found desirable to ground the lead going to the squib when it is desirable that the missile be unarmed, hence, switch 13 is a single-pole double-throw switch. Switches 13 and 14 are shown in the "off" position. In the "on" position the contacts are closed permitting the GGS energy to feed through and ignite the squib. Small conventional snap action switches such as microswitches, have been found to be satisfactory.

Figure 4:
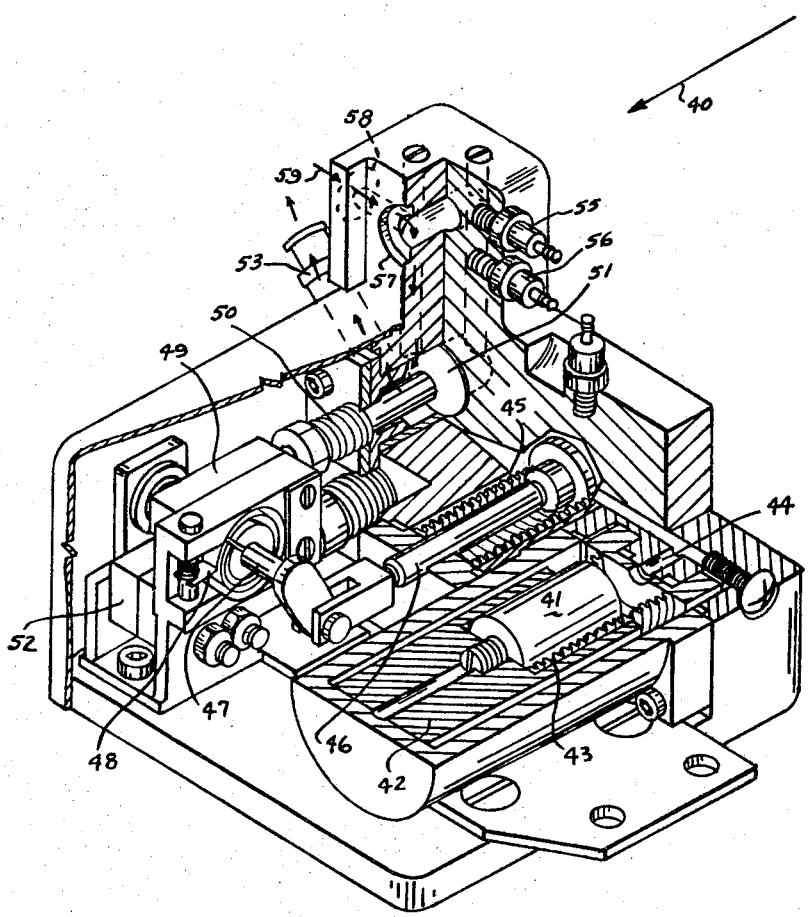
FIG. 4 is a view of a typical acceleration sensor and actuated valve in the safe or closed position.

FIG. 4 is a cutaway view of the assembly of an acceleration sensor, two-way valve, and switch that is used in an operating embodiment of this invention. The sensitive axis and direction are shown by the arrow 40. The view shows the valve in the safe or discharge passage condition. The cover and some of the parts are shown partially broken away with the electrical wiring from the terminals 55 and 56 to the switch 52, not shown. In this condition of acceleration the valve 51 is seated at the far end of its operating cylinder, sealing off the through passage port 57 that leads toward the battery. The electrolyte "in" port 58 is connected, via the valve cylinder, to the discharge port 53. This discharge port may lead directly "overboard" the missile or to a cotton-filled sump. In this condition the flow arrows 59 shows that should electrolyte find its way to this assembly through inlet port 58 that it would be "piped" to the sump or overboard instead of to the battery.

The value 51 is retained in this discharge passage condition by the interaction of a cutout portion of the latch shaft 47 and a slot in the latch 49. The latch shaft 47 is deterred from movement by vibration by the clock spring type latch spring 48, and the valve spring 50 is held in compression. The contacts of switch 52 are normally in the "off" position or open to the GGS line terminals 55 and 56. Movement of the valve latch 49 actuates the switch to the "on" position, closing the contacts, and completes part of the electrical circuit leading to the squib pressure cartridge.

FIG. 5 shows the momentary condition of the acceleration sensor and valve assembly after positive acceleration of the vehicle (missile) in the direction indicated 40 has occurred. Positive acceleration in this direction (40) may be produced, of course, by a decrease in velocity of a missile traveling in the opposite direction. The acceleration, along the axis and in the direction indicated, by arrow 40, has caused the mass 41 to move compressing the silicone fluid contained in the volume ahead of the mass. Silicone fluid flows through the passage 44, into the volume of the silicone actuating chamber ahead of the piston of actuator shaft 46 moving the actuator shaft 46 back, as is shown in FIG. 5 (compared to FIG. 4). This shaft 46, through its clevis and the crank on the latch shaft 47, has rotated the latter so the cutout portion of the shaft is no longer engaging the valve latch 49.

In normal operation the attitude shown in FIG. 5 exists for only an instant of time because at the disengagement of the valve latch 49 the compressed valve spring 50 drives the latch 49 forward, a narrow portion of the slot in the latter riding over the cutout portion of the shaft 47, and the condition as shown in FIG. 6 exists. The motion of the shaft has carried the valve plate 56 to the opposite end of the cylinder where it has sealed off the discharge port 53 and opened the passage to the through passage port 57. The valve is thus in the through passage condition (as shown by the flow arrows) so that the electrolyte may flow through the two-way valve to the pressure sensor actuated two-way valve. The switch 52 has been closed to the "on" position and the acceleration sensor, valve, and switch assembly has been activated.

An important safety feature of this assembly is a fusible eutectic plug 54 which fills a hole in the back wall of the silicone cavity in front of the piston of the actuator shaft 46. While this plug is in place the cavity may be pressurized to move shaft 46, which is the normal mode of operation. If the assembly is exposed to a thermal environment greater than the melting point of the plug, the plug melts out, opening the silicone actuating chamber, the silicone then fluid flows out of the plug hole to the exterior of the assembly and will not move the shaft 46. In addition, by the melting of the plug the fluid can not be expanded by heat to cause inadvertent operation of the valve. It has been found desirable to use a plug made of a eutectic composition; that is, a material having a transition directly from a solid state to liquid state without a mushy state in between the solid and liquid states. With conventional squibs a melting temperature at approximately 200 degrees F., has been found to be satisfactory. An example of a material that has been found to be satisfactory is Cerro De Passo Compound No. 5160–1.

Figure 7:
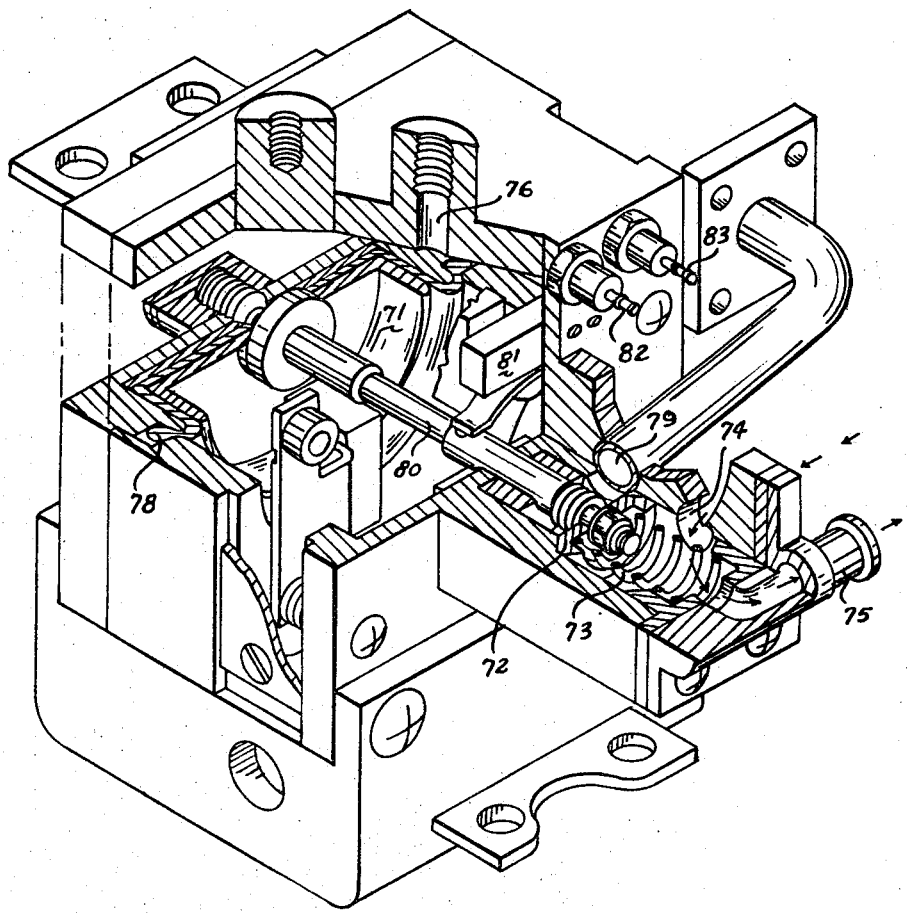
FIG. 7 is a view of a typical pressure sensor and actuated valve shown in the safe or closed position.
Figure 8:
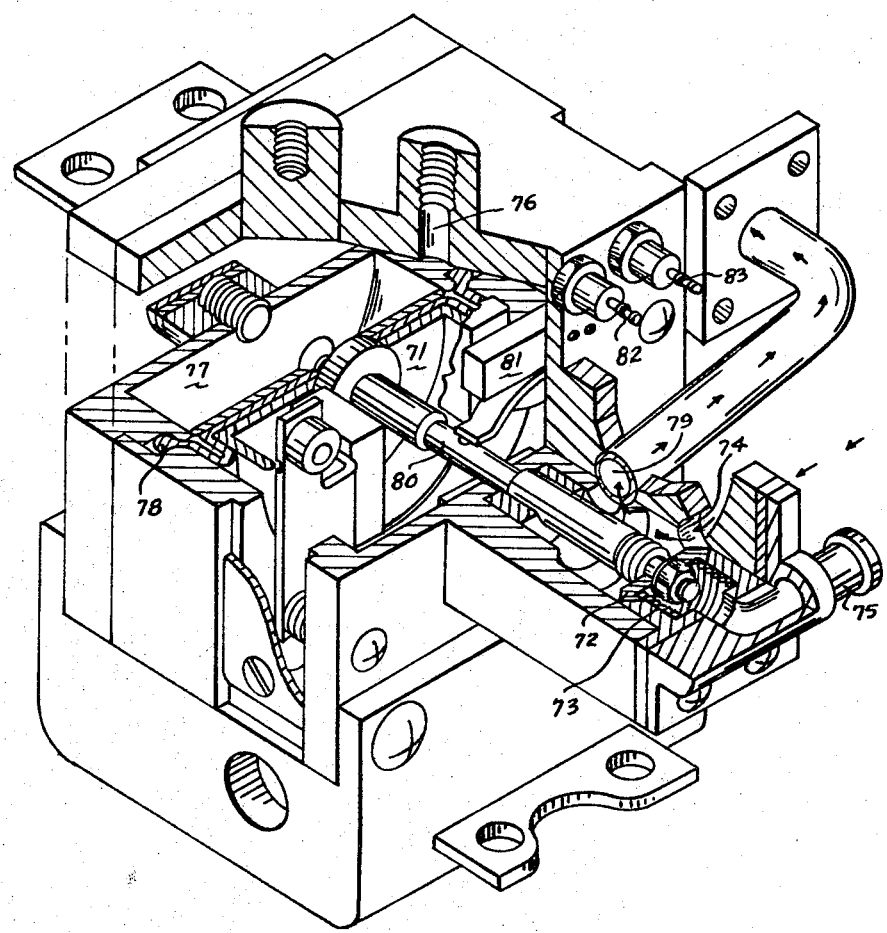
FIG. 8 is a view of the sensor of FIG. 7 shown in the open position.

An embodiment of a pressure sensor and valve is shown in FIGS. 7 and 8. FIG. 7 is a cutaway view of the assembly with the valve in the safe or discharge passage condition. The mass of the moving parts is small; thus, this sensor and valve is not directionally sensitive. The plunger 71 and the poppet valve head 72 are being held in the discharge passage position by the valve spring 73; thus the electrolyte "in" port 74 is connected only to the discharge passage port 75 as shown by the flow arrows.

FIG. 8 is a view of the same pressure sensor and valve shown in FIG. 7 except here the ambient pressure has undergone a negative change (dropped) and the valve has changed from the discharge passage condition to the through passage condition. In a typical operating embodiment the valve arms at approximately 70,000 feet of altitude when the air entrapped behind the plunger-diaphragm 78 in the air space 77 expands because of the low pressure (approximately 1.47 p.s.i.a.) applied to the inside of the pressure sensor through the vent to ambient atmosphere 76. The air tightness of the space 77 is maintained by the flexible diaphragm 78. The expansion of the air in space 77 drives the plunger 71, shaft 80, and poppet 72 forward against the force of the valve spring 73 establishing the armed through passage condition. With the valve in the through passage condition the electrolyte "in" port 74 is connected to the "to battery" port 79, as shown by the flow arrows, and the discharge passage port 75 is blocked off. In this position the contacts of the switch 81 have been closed by the cam-like portion of the shaft 80, thus completing this part of the squib cartridge electrical lead firing circuit contained between terminals 82 and 83.

The acceleration sensor, two-way valve, and switch shown in FIGS. 5, 6, and 7 and the pressure sensor, two-way valve, and switch shown in FIGS. 7 and 8 are used in the system shown in FIG. 3. It is to be understood that the same sensors and valves may be used in the systems diagrammed in FIG. 2 by omitting the electrical switches.

What is claimed is:

1. The improvement in a fluid armed battery activator system for missiles having a squib gas generator communicating with an electrolyte fluid reservoir having a a fluid flow outlet, and a dry charged battery having a fluid flow inlet, for providing electrical energy to the missile war head, the improvement for activating the battery only under predetermined conditions of acceleration and pressure comprising:
(a) a first two-way valve means having a through passage condition and a discharge passage condition, communicating with the said fluid flow outlet of the fluid reservoir;
(b) acceleration sensing means responsive to acceleration for actuating the said first two-way valve means in response to the acceleration of the missile;
(c) a second two-way valve means having a through passage condition and a discharge passage condition, communicating with the said through passage of the said first two-way valve;
(d) pressure sensing means responsive to ambient pressure for actuating the said second two-way valve means in response to a change in ambient pressure; and
(e) fluid flow means communicating with the said through passage condition of the said second two-way valve means and with the said fluid flow inlet of the dry charged battery, whereby only under the said predetermined conditions of acceleration and pressure, electrolyte fluid will flow from the said reservoir to, and activate, the said battery.

2. The improvement, as claimed in claim 1 wherein:
(a) the acceleration is due to a decreasing velocity change, and
(b) the change in ambient pressure is a negative change.

3. The improvement in a missile fluid armed battery activator system having a squib gas generator communicating with an electrolyte fluid reservoir having a fluid flow outlet, a dry charged battery having a fluid flow inlet, and an electrical initiation signal for igniting the squib gas generator, the improvement for connecting the said initiation signal to the squib gas generator only at predetermined conditions of acceleration, temperature and pressure, and providing a fluid flow passage from the reservoir to the battery only under the same predetermined conditions, of acceleration, temperature, and pressure, the said improvement comprising:
(a) a first two-way valve means having a silicone actuating chamber means and having a through passage condition and a discharge passage condition, the said first two-way valve communicating with the said fluid flow outlet of the fluid reservoir, and having
(1) a first electrical switch means with at least an "on" and an "off" position responsive to the condition of the said first two-way valve means and being in the "on" position when the said first two-way valve means is in the through passage condition, and having
(2) a fusible eutectic plug means cooperating with the said silicone actuating chamber means for opening the said chamber at temperatures above the said predetermined temperature;
(b) acceleration sensing means responsive to acceleration for actuating the said first two-way valve means to the through passage condition in response to the predetermined condition of acceleration of the missile;
(c) a second two-way valve means having a through passage condition and a discharge passage condition communicating with the said through passage of the said first two-way valve; and having
(1) a second electrical switch means with at least an "on" and an "off" position responsive to the condition of the said second two-way valve means and being in the "on" position when the said second two-way valve means is in the through passage condition;
(d) pressure sensing means responsive to ambient pressure for actuating the said second two-way valve means to the through condition in response to the said predetermined condition of ambient pressure;
(e) fusible fluid flow passage means communicating with the said through passage of the said second two-way valve means and with the fluid flow inlet of the dry charged battery for providing a fluid flow passage from the second two-way valve means to the dry charged battery at the said predetermined conditions of temperature; and
(f) electrical connecting means for connecting the said first switch means and the said second switch means in series relationship and providing an electrical circuit for the said electrical initiation signal to the squib.

4. The improvement as claimed in claim 3 wherein the said predetermined conditions of acceleration are conditions of acceleration of decreasing velocity change; the said predetermined conditions of pressure are ambient pressures less than approximately two pounds per square inch absolute; and the said predetermined conditions of temperature are temperatures less than the thermal ignition temperature of the said squib.

References Cited
UNITED STATES PATENTS

| | | | |
|---|---|---|---|
| 2,674,946 | 4/1954 | Hjelm | 102—70.2 |
| 3,077,524 | 2/1963 | Blackburn | 102—81 X |
| 3,343,489 | 9/1967 | Whitehouse | 102—49.6 |

BENJAMIN A. BORCHELT, *Primary Examiner.*

V. R. PENDEGRASS, *Assistant Examiner.*